US011913268B2

(12) United States Patent
Hilliaho

(10) Patent No.: US 11,913,268 B2
(45) Date of Patent: Feb. 27, 2024

(54) GLASS PANEL SYSTEM

(71) Applicant: LUMON INVEST OY, Valkeala (FI)

(72) Inventor: Esa Hilliaho, Valkeala (FI)

(73) Assignee: LUMON INVEST OY, Valkeala (FI)

( * ) Notice: Subject to any disclaimer, the term of this patent is extended or adjusted under 35 U.S.C. 154(b) by 75 days.

(21) Appl. No.: 17/686,487

(22) Filed: Mar. 4, 2022

(65) Prior Publication Data

US 2022/0290478 A1 Sep. 15, 2022

(30) Foreign Application Priority Data

Mar. 15, 2021 (FI) ..................................... 20215281

(51) Int. Cl.

*E05D 15/00* (2006.01)
*E05D 15/06* (2006.01)
*E05D 15/08* (2006.01)

(52) U.S. Cl.

CPC ......... *E05D 15/0691* (2013.01); *E05D 15/08* (2013.01)

(58) Field of Classification Search

CPC ............................ E05D 15/0691; E05D 15/08
USPC .................................................... 49/453, 456
See application file for complete search history.

(56) References Cited

U.S. PATENT DOCUMENTS

| | | | |
|---|---|---|---|
| 1,799,482 | A | 4/1931 | Schlacks |
| 2,638,190 | A | 5/1953 | Watkins |
| 2,788,097 | A | 4/1957 | Frick |
| 2,847,726 | A | 8/1958 | Frick |
| 2,869,187 | A | 1/1959 | Liebman et al. |
| 3,208,110 | A | 9/1965 | Griffin |
| 3,309,816 | A | 3/1967 | Malone, Jr. |
| 3,491,483 | A | 1/1970 | Miller |
| 3,996,711 | A | 12/1976 | Pearson |
| 4,535,578 | A | 8/1985 | Gerken |
| 5,005,315 | A | 4/1991 | Jackson, Jr. |
| 5,103,589 | A | 4/1992 | Crawford |
| 6,018,913 | A | 2/2000 | Lin |
| 6,532,699 | B1 | 3/2003 | Franklin et al. |
| 6,685,253 | B1 | 2/2004 | Wolcott |

(Continued)

FOREIGN PATENT DOCUMENTS

| | | |
|---|---|---|
| CH | 671 069 A5 | 7/1989 |
| DE | 22 58 179 A1 | 5/1974 |

(Continued)

OTHER PUBLICATIONS

Oct. 1, 2021 Search Report issued in Finnish Patent Application No. 20215281.

*Primary Examiner* — Daniel J Troy
*Assistant Examiner* — Daniel Alvarez
(74) *Attorney, Agent, or Firm* — Oliff PLC

(57) ABSTRACT

A glass panel system comprising an upper and lower guide track and at least two adjacent glass panels which are movable along the lower and upper guide tracks. The lower guide track is configured to support at least two glass panels. The upper guide track comprises two opposite side walls, an elongated groove and a free space formed between the two side walls. One of the glass panels leans against both the side walls by one guide element and against one of the two side walls and against another glass panel by another guide element. One of the glass panels leans, on one hand, against one of the two side walls and against another glass panel by one guide element and, on the other hand, against the other side wall and against another glass panel by another guide element. The guide elements are arranged in the free space.

8 Claims, 6 Drawing Sheets

(56) References Cited

U.S. PATENT DOCUMENTS

| | | | | |
|---|---|---|---|---|
| 7,207,141 | B2 | 4/2007 | Sullivan | |
| 8,261,500 | B2 | 9/2012 | Sprague | |
| 8,375,645 | B2 | 2/2013 | Iwauchi et al. | |
| 8,499,496 | B2 | 8/2013 | Picchio | |
| 9,631,409 | B2 * | 4/2017 | Wang | E05F 17/00 |
| 10,407,960 | B2 * | 9/2019 | Wolfe | E05B 65/0085 |
| 10,538,914 | B2 | 1/2020 | Lehtonen | |
| 2007/0151179 | A1 | 7/2007 | Speyer et al. | |
| 2007/0175121 | A1 * | 8/2007 | Speyer | E06B 3/46 52/207 |
| 2010/0289299 | A1 | 11/2010 | Kitayama | |
| 2012/0189378 | A1 * | 7/2012 | Visa | E06B 3/5436 403/267 |
| 2014/0326419 | A1 | 11/2014 | Ona-Gonzalez et al. | |
| 2015/0284949 | A1 | 10/2015 | Hilliaho | |

FOREIGN PATENT DOCUMENTS

| | | | | |
|---|---|---|---|---|
| DE | 2258179 | * | 5/1974 | E05D 15/08 |
| DE | 3425484 | A1 | 1/1986 | |
| DE | 10 2009 027 242 | A1 | 12/2010 | |
| EP | 2 792 831 | A1 | 10/2014 | |
| EP | 2792831 | A1 * | 10/2014 | E05D 15/066 |
| EP | 3002401 | A1 | 4/2016 | |
| EP | 3 168 408 | A1 | 5/2017 | |
| EP | 3467248 | A1 | 4/2019 | |
| KR | 100775020 | B1 | 11/2007 | |
| KR | 100806744 | B1 | 2/2008 | |
| KR | 101244871 | * | 3/2013 | E05D 15/06 |
| KR | 101432557 | B1 | 8/2014 | |
| WO | 2014/068178 | A1 | 5/2014 | |
| WO | 2017/081364 | A1 | 5/2017 | |

* cited by examiner

GLASS PANEL SYSTEM

OBJECT OF THE SOLUTION

The object of the solution is a glass panel system.

BACKGROUND OF THE PRESENT SOLUTION

Various types of glass panel systems may be incorporated in buildings, for example, in conjunction with a balcony or terrace of a building. In many cases, a glass panel is made of tempered glass and may comprise several laminated glass layers. A glass panel system typically comprises several glass panels which are preferably placed one after another and which in the closed position constitute a wall.

A glass panel system typically comprises an upper guide track and a lower guide track for guiding the movement of the glass panel, one or more guide elements being placed within or on top of the guide tracks and fixed to the glass panel. Typically, an edge strip is fastened to an edge of the glass panel, and the guide element is fastened to the edge strip. The guide element guides the movement of the glass panel along the upper guide track or the lower guide track, for example so that by means of them the glass panel leans against the upper guide track which gives support to the glass panel in a lateral direction and keeps it in upright position, or so that the glass panel is supported by them to the lower guide track supporting the glass panel, for example, on top of a structure or a rail in the lower guide track. The glass panel is typically moved by transferring it manually, for example by pushing.

The upper and lower guide tracks are normally installed in the horizontal position and fixed, for example, to structures of a building. The lower guide track may be positioned on floor level or higher, for example, in or on a railing. The upper guide track may be arranged close to a ceiling.

In a wall formed by two or more glass panels, all the glass panels may move in different planes so that they can be moved adjacent and close to each other. In this way, an opening or a passage can be opened in a wall. When stationary and when moving, the glass panels remain in parallel. For this purpose, the lower guide track may be provided with a number of adjacent and parallel structures, for example rails, along which the glass panels are moved.

Some glass panel systems of prior art are disclosed in documents EP 3467248 A1 and EP 3002401 A1.

In a glass panel system consisting of two or more glass panels, a stopper element may be attached to a glass panel, for example its edge strip, to form a protrusion extending from the glass panel in a lateral direction. When the glass panel is moved, the stopper element may be placed against an adjacent glass panel or its corresponding stopper element. In this situation, the moving glass panel may pull the adjacent glass panel along or push the adjacent glass panel in front of it. The glass panels may thus be side by side or one after the other in different planes.

The stopper elements may be difficult to position and use.

A BRIEF SUMMARY OF THE SOLUTION PRESENTED

In the presented solution, a glass panel leans, on one hand, against both side walls of an upper guide track by means of one guide element and, on the other hand, against one side wall of the upper guide track and against an adjacent glass panel by means of another guide element. Between the side walls, the upper guide track is provided with a free space which is common to the guide elements and in which the guide elements are placed.

The glass panel system according to the solution comprises a lower guide track and an upper guide track which are substantially horizontal and parallel, and at least two adjacent glass panels which are arranged in a vertical position and connected between the lower guide track and the upper guide track so that the glass panels are movable along the lower guide track and the upper guide track in their longitudinal direction.

The lower guide track is configured to support the at least two glass panels, each configured to follow its own path along the lower guide track.

The upper guide track comprises two opposite side walls arranged in parallel and extending in the longitudinal direction of the upper guide track so that an elongated groove is formed between the side walls, the groove being downward open and extending in the longitudinal direction of the upper guide track so that a free space is formed in the upper guide track, extending from one side wall to the other side wall.

The glass panel system according to the solution further comprises a number of guide elements which are placed in the free space and which are configured to lean against at least the upper guide track when moving; and the first glass panel whose upper part is provided with a first guide element and a second guide element spaced from each other.

The first guide element of the first glass panel comprises two opposite protrusions which lean against different side walls. The second guide element comprises two opposite protrusions, one of which leans against one side wall and the other leans against a glass panel which is adjacent to the first glass panel. The adjacent glass panel is provided with a guide element comprising two opposite protrusions, one of which leans against one side wall and the other leans against the first glass panel.

In an example, a guide element of a glass panel is configured to hit a guide element of an adjacent glass panel so that by means of these guide elements, the moving glass panel forces the adjacent glass panel to follow the movement after the glass panel has moved beside the adjacent glass panel and continues its movement. The aim is to bring the glass panels in parallel, close to each other, in different planes.

According to an example, a protrusion of a guide element of a glass panel is configured to engage a protrusion of a guide element of an adjacent glass panel which simultaneously leans against the glass panel. The engagement takes place so that by means of these protrusions, the moving glass panel forces the adjacent glass panel to follow the movement after the glass panel has moved past the adjacent glass panel and continues its movement. The aim is to arrange the glass panels one after each other in different planes.

According to an example, each guide element is fastened to an upper part of a glass panel by way of an edge strip fastened to an upper edge of the glass panel. In an example, each guide element is arranged at an end and/or on top of the edge strip.

The presented solution has the advantage that the guide elements lean against the upper guide track, and the structure of the upper guide track can be kept simple. The placement of the upper guide track is easier when the glass panel is supported from below so that the position of the glass panel and the guide element within the upper guide track can be changed, particularly in the vertical direction. In this way, room for adjustment can be provided for the upper panel. The presented solution also allows the room for adjustment.

The presented solution simplifies the structure of the upper guide track and the guide elements. It is easy to fasten the guide element to the glass panel. The guide elements can now be concealed within the upper guide track. While the guide elements act as components giving support to the glass panels, they also guide the movement of the glass panels within the upper guide track. Moreover, they act as the above-mentioned stopper elements. Functions allowing the movement of two or more glass panels together can be incorporated in the function of the guide elements, in addition to giving support to the glass panels. In this way, the glass panels can be moved side by side or one after the other by moving merely one glass panel which pushes or pulls other glass panels to join the movement.

DESCRIPTION OF THE DRAWINGS

The solution presented will be described in greater detail in the following, with reference to the accompanying drawings.

DETAILED DESCRIPTION OF THE SOLUTION

For understanding the features of the presented solution, the following description will refer to examples shown in the appended figures. These figures are schematic representations and they are not intended to illustrate the size or dimensions of the different components in proportion so that they would restrict features of the solution.

In the figures and in this description, the same or corresponding components are marked with the same reference number.

In this description, the terms “horizontal” and “vertical” refer to the directions in relation to an absolute reference which is, for example, the ground plane. These terms will be referred to when the presented solution is viewed in its installed position, ready for use. Furthermore, the terms “upper” and “lower” refer to the use position. The vertical direction is denoted by reference Z, and two orthogonal horizontal directions are denoted by references X and Y.

In this description, the term “parallel” or “transverse” should not be understood as a requirement to be absolutely parallel or absolutely transverse. The term “opposite” refers, for example, to features or components which extend or face in opposite directions with respect to each other, for example away from each other, or are placed on different sides of a component.

In this description, adjacent glass panels refer to two glass panels which extend in different planes and between which no other glass panels are placed, or between which no other glass panels can be moved when the two glass panels are aligned. The imaginary planes are parallel and spaced from each other.

Figure 1:
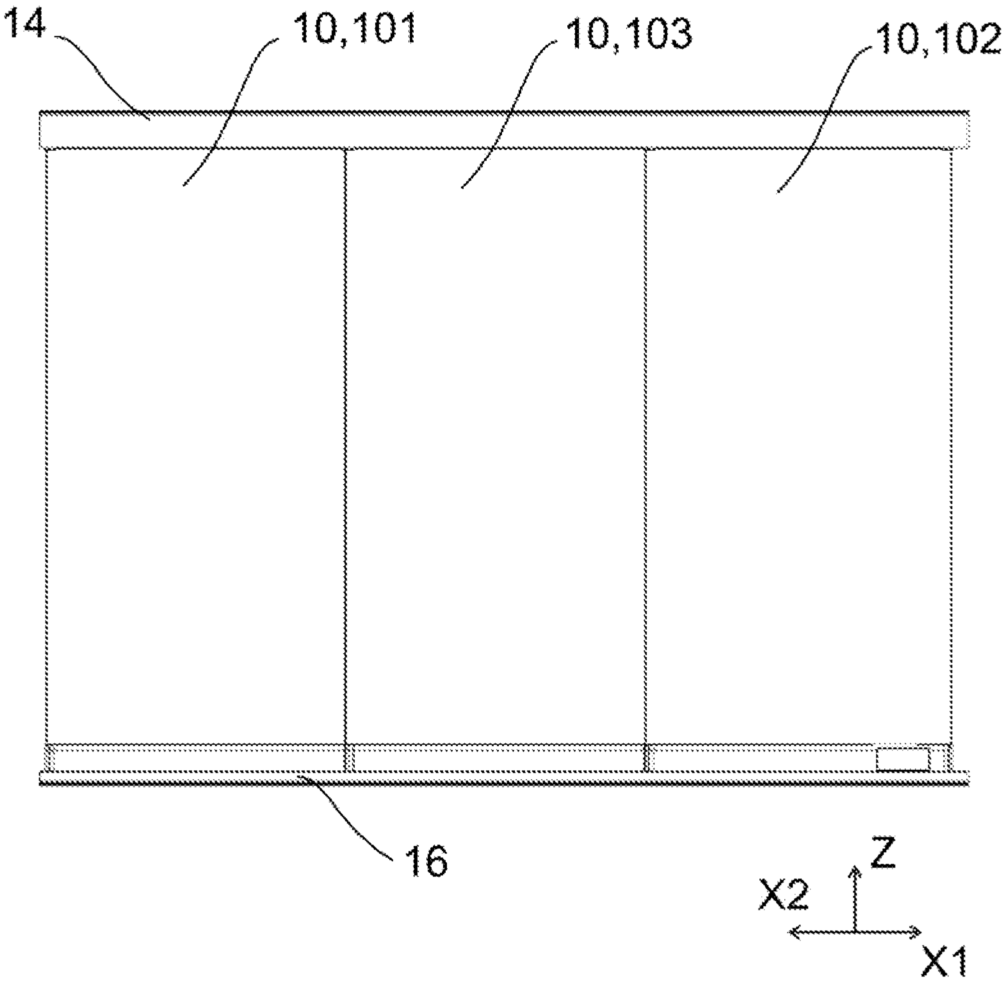
FIG. 1 shows a front view of an installed glass panel system to which the solution presented is applied and which is used in vertical position, as shown in the figure, and in which glass panels are arranged one after another in different planes.

FIG. 1 shows an example of a glass panel system to which the presented solution may be applied. In FIG. 1, the glass panel system is in its installed position and ready for use, whereby its glass panels 10 are primarily vertical, forming a vertical plane. In the following description, the glass panel system according to the presented solution will be described in its installed position, ready for use.

The glass panel system according to the presented system comprises a lower guide track 16, an upper guide track 14, two or more adjacent glass panels 10, and a number of guide elements 24 fastened to the glass panels 10.

Each glass panel 10 is coupled between the lower guide track and the upper guide track 14, 16 so that the glass panels 10 are movable along the lower guide track and the upper guide track 14, 16 in their longitudinal direction. The glass panel 10 is typically moved by transferring it manually, for example by pushing.

In other words, the glass panel 10 is movable in two opposite directions of movement X1, X2. The longitudinal direction is preferably horizontal. The lower guide track and the upper guide track 14, 16 prevent displacement of the glass panel 10 in two opposite lateral directions, that is, directions across or transverse to the directions of movement X1, X2, as regards the horizontal direction. The displacement is limited but possible only within the clearances which are provided between different components in the structure, which are due to the manufacture, and which are natural or are necessary for smooth functioning, e.g. with low friction.

The glass panels 10 are placed in different planes with respect to each other when they are in parallel with the lower guide track and the upper guide track 14, 16. When stationary and when in motion, the glass panels 10 remain in parallel.

Figure 3:
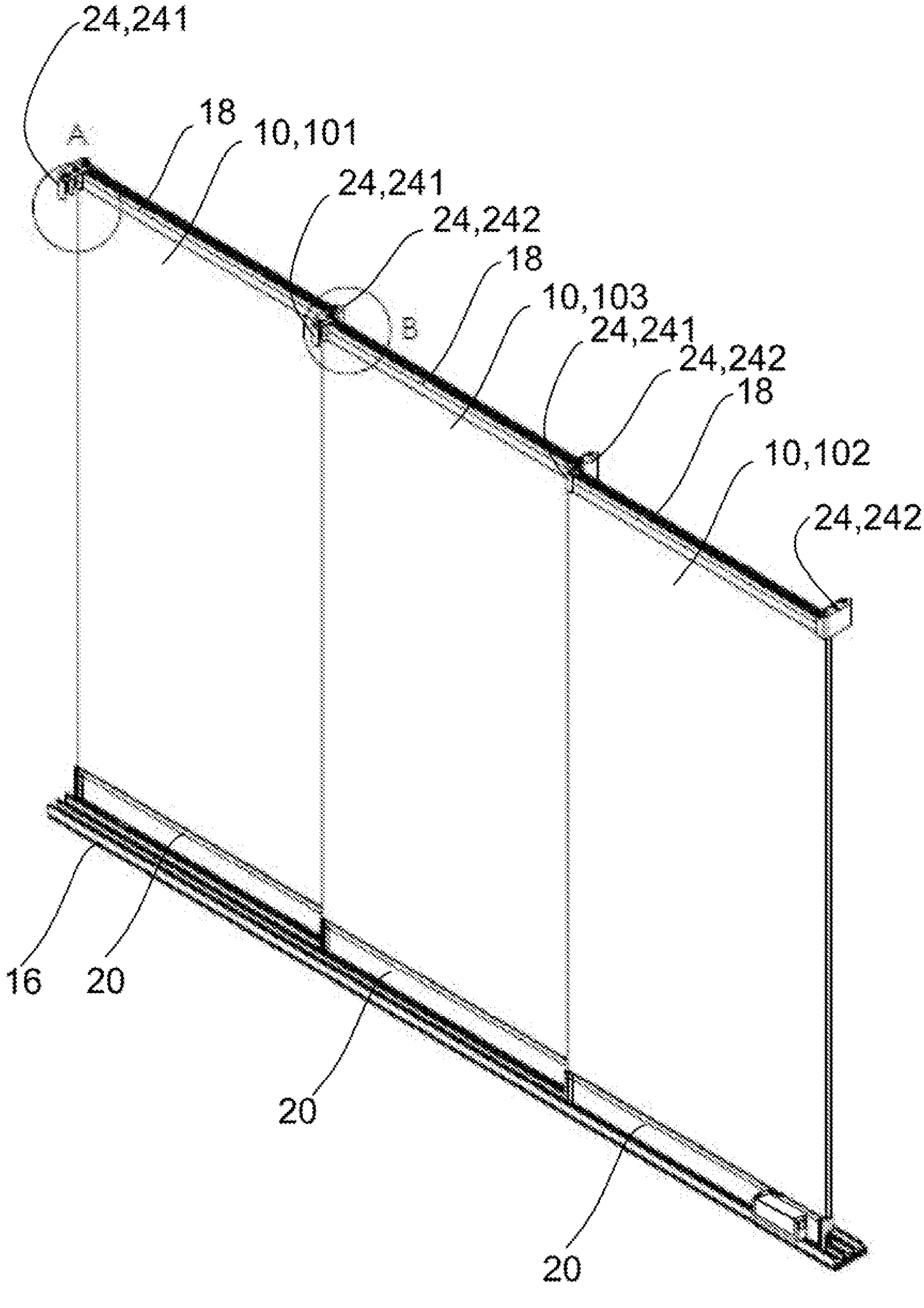
FIG. 3 shows a slanted view of the glass panel system of FIG. 1, from which the upper guide track is omitted for illustration, and in which the glass panels are placed one after another in different planes.
Figure 4:
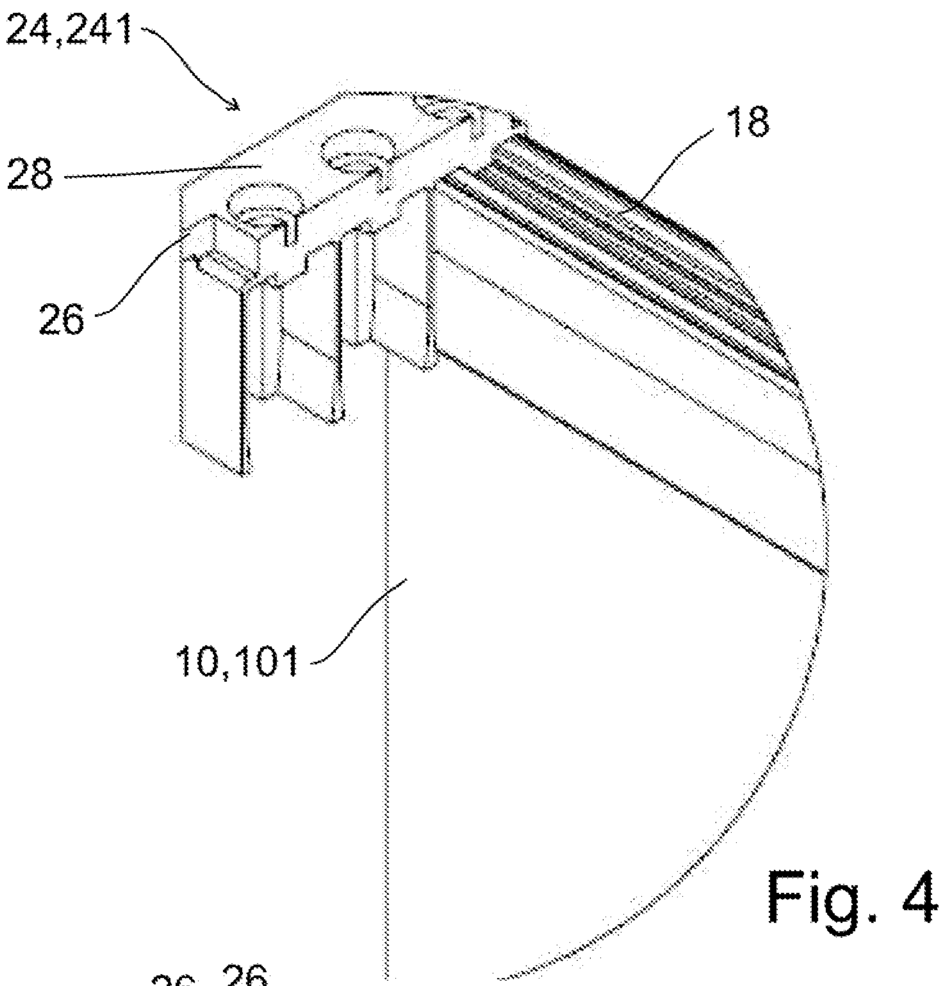
FIG. 4 shows detail A of FIG. 3, illustrating a guide element for a glass panel.
Figure 5:
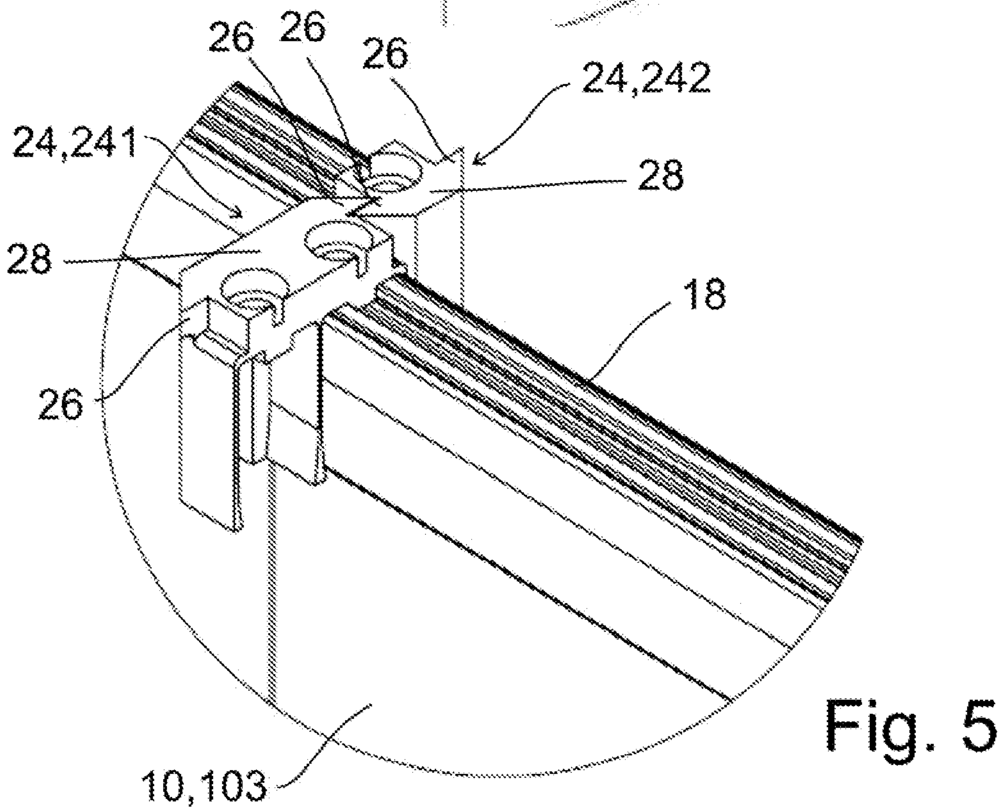
FIG. 5 shows detail B of FIG. 3, in which the guide elements of two adjacent glass panels are placed against each other.
Figure 6:
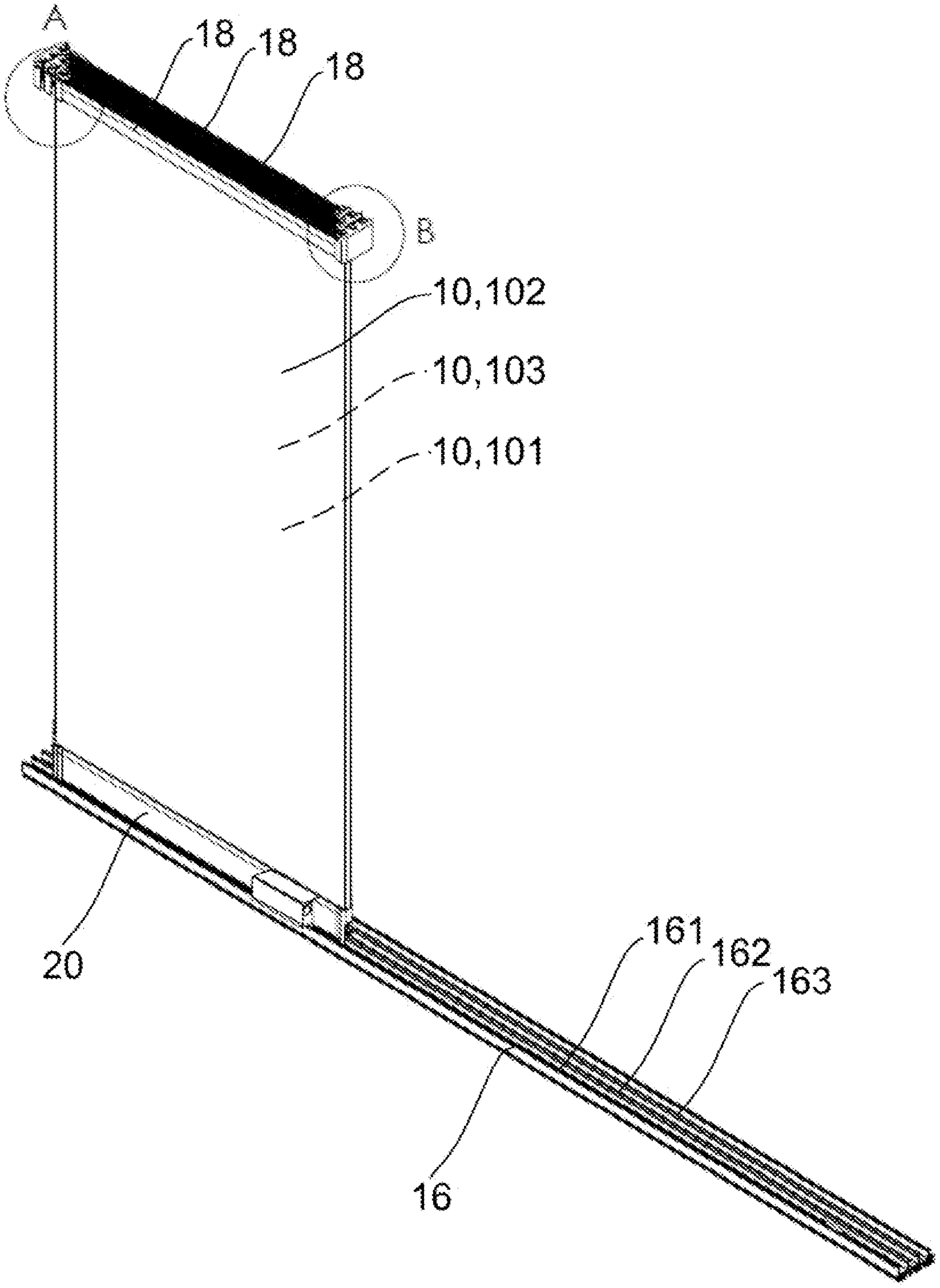
FIG. 6 shows a slanted view of the glass panel system of FIG. 1, from which the upper guide track is omitted for illustration, and in which the glass panels are arranged in parallel in different planes.
Figure 7:
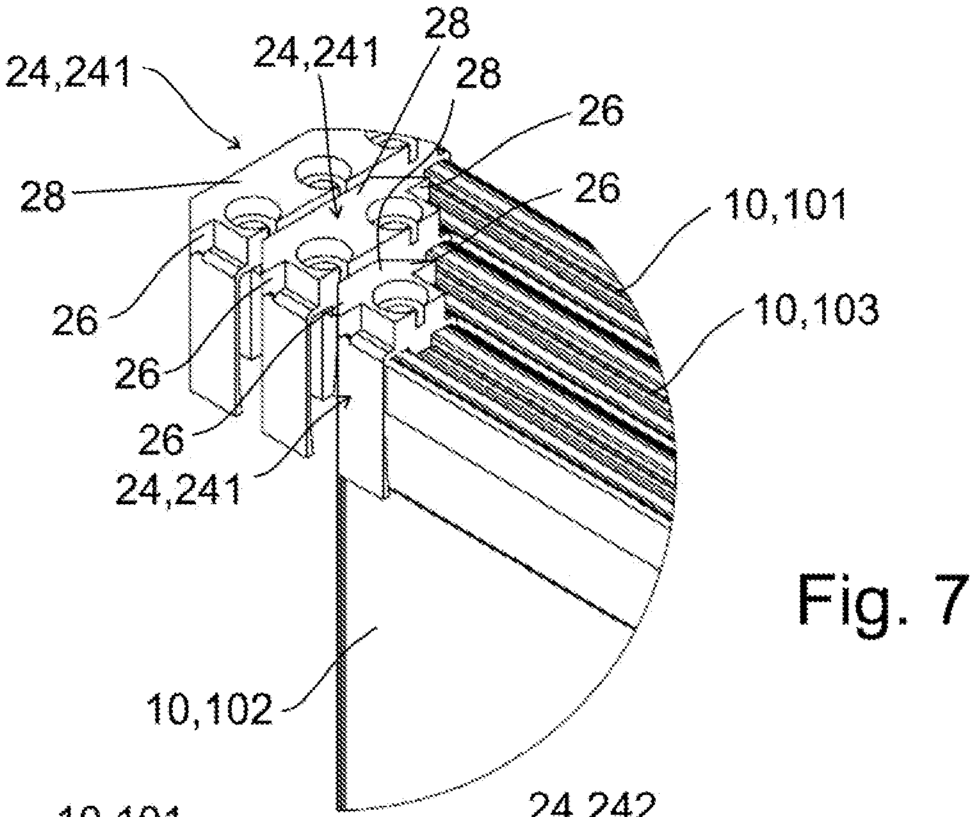
FIG. 7 shows detail A of FIG. 6 illustrating the first guide elements of the glass panels.
Figure 8:
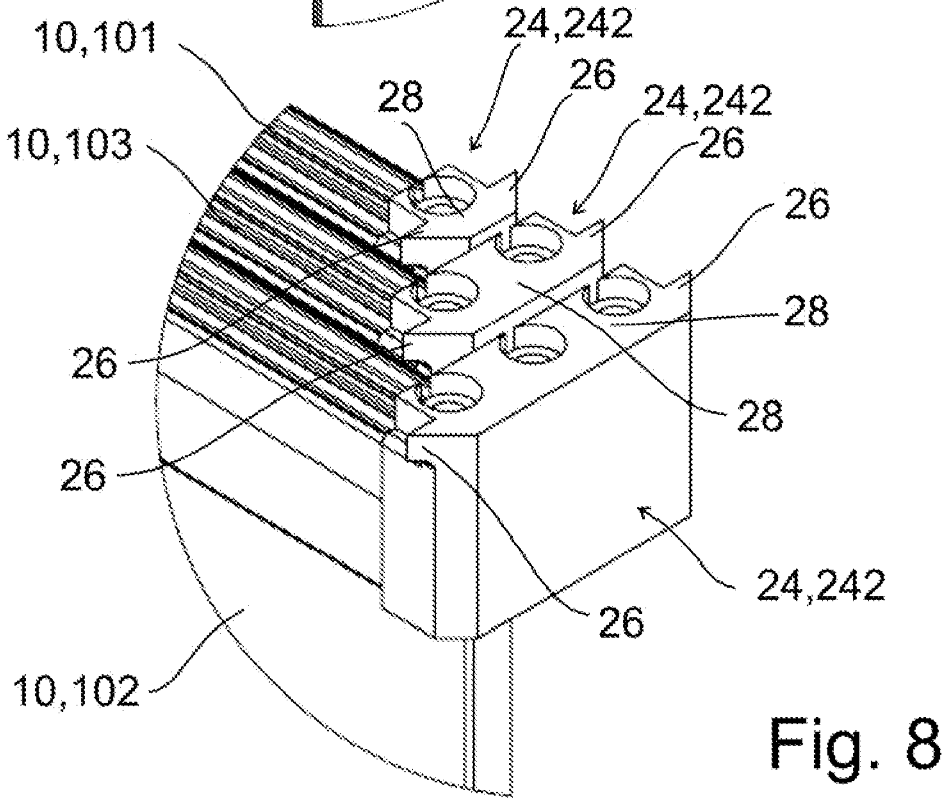
FIG. 8 shows detail B of FIG. 6 illustrating the second guide elements of the glass panels.

As shown in FIG. 6, the glass panels 10 can be placed in parallel, that is, aligned close to each other and in different planes with respect to the lateral direction. Arranged as shown in FIG. 3, the glass panels 10 may be placed in a row with respect to the longitudinal direction, but they are still in different planes as mentioned above.

In combination, the glass panels 10 constitute a wall, a window, or an openable passage.

In this description, adjacent glass panels 10 refer to two glass panels 10 extending in different planes, no other glass panels 10 being placeable between them. The two glass panels 10 may be arranged one after another in different planes but they are movable beside each other, and their travel paths are also in parallel.

The glass panel system may also comprise other glass panels whose operation is not in accordance with the presented solution. Such a glass panel is, for example, immovable or openable, or constitutes a door. The glass panel may even move along the travel path of a glass panel 10 constituting a part of the presented solution.

In an example, the lower guide track and the upper guide track 14, 16 are parallel and are placed on top of each other, at a distance from each another. The two opposite upright edges of the glass panel 10 are vertical, and the upper and lower edges of the glass panel 10 are horizontal. The lower guide track 16 may be fastened to a suitable surface, e.g. a floor, a door sill, or the bottom of a frame. The lower guide track 16 may be at least partly embedded in this surface, e.g. the floor. The upper guide track 14 may be fastened to a suitable surface, e.g. a ceiling, a structure installed below the ceiling, or the top of a frame. According to an example, the glass panels 10 are delimited on one or both sides by a suitable surface, e.g. a wall, a structure fastened to a wall, or the side of a frame. A railing or a handrail may be provided beside the glass panels 10. The railing may be fastened to a suitable surface, for example by posts. The railing can be fastened to a wall, a floor, a door sill, the bottom of a frame, or the side of a frame.

As shown in FIGS. 1, 3 and 6, the lower guide track 16 supports the glass panel 10 and its weight, for example by means of two guide elements. The lower guide 16 is provided with a separate path 161, 162, 163 for each glass panel 10, to be followed by the glass panel 10, for example by means of the guide element. The paths 161, 162, 163 are parallel and aligned. For example, the path is formed by a structure of the lower guide track 16 which is preferably horizontal, linear, and extends in the directions of movement X1, X2. The structure is, for example, a rail or a ridge, on top of which the glass panel 10 is supported, for example by means of the guide element. The glass panel 10 or the guide element glides or rolls along the lower guide track 16, and the guide element, fastened to a lower part of the glass panel 10, may be, for example, a wheel or a roll.

At least one guide element may be fastened to the lower part of the glass panel 10. The guide element is fastened, for example, to the lower edge of the glass panel 10. According to another example, the guide element is fastened to the lower part of the glass panel 10 by means of an edge strip 20. The edge strip 20 is fastened, for example, to the lower edge of the glass panel 10. For example, the guide element is placed partly within the edge strip 20.

In FIGS. 3 and 6, the glass panel system is shown without the upper guide track 14 of FIG. 1, for illustration.

As shown in FIGS. 1, 3 and 6, the upper guide track 14 guides the glass panel 10 and its movement in the directions X1 and X2, for example by means of two guide elements 24.

The upper guide track 14 comprises two opposite side walls 141, 142 which are parallel and extend in the longitudinal direction of the upper guide track 14 so that an elongate groove 22 is formed between the side walls. The groove 22 is open downwards and extends in the longitudinal direction of the upper guide track 14. By means of the groove 22, the upper guide track 14 is also provided with a free space extending from one side wall 141 to the other side wall 142. Preferably, this free space is arranged in a lower part of the upper guide track 14, seen in its position of use.

For example, the structure of the upper guide track 14, followed by the glass panel 14 e.g. by means of the guide element 24, gives support to the glass panel 10 in the lateral direction, for example by means of the guide element 24. For example, the glass panel 10 or the guide element 24 glides or rolls along the upper guide track 14. In other words, the free space of the groove 22 is common to the guide elements 24.

The guide elements 24 are placed in the free space, and when moving with the glass panels 10, they can lean against at least the upper guide track 14, for example one or both of its side walls 141, 142. In an example, each guide element 24 leans against either one side wall or both side walls 141, 142. In another example, each guide element 24 leans against either two side walls 141, 142 or one side wall 141, 142 and one adjacent glass panel 10.

The guide elements 24 are interposed between the side walls 141, 142, and the side walls 141, 142 extend vertically e.g. so that the guide elements 24 are totally, almost totally, or at least partly covered, seen in a horizontal direction.

Figure 2:
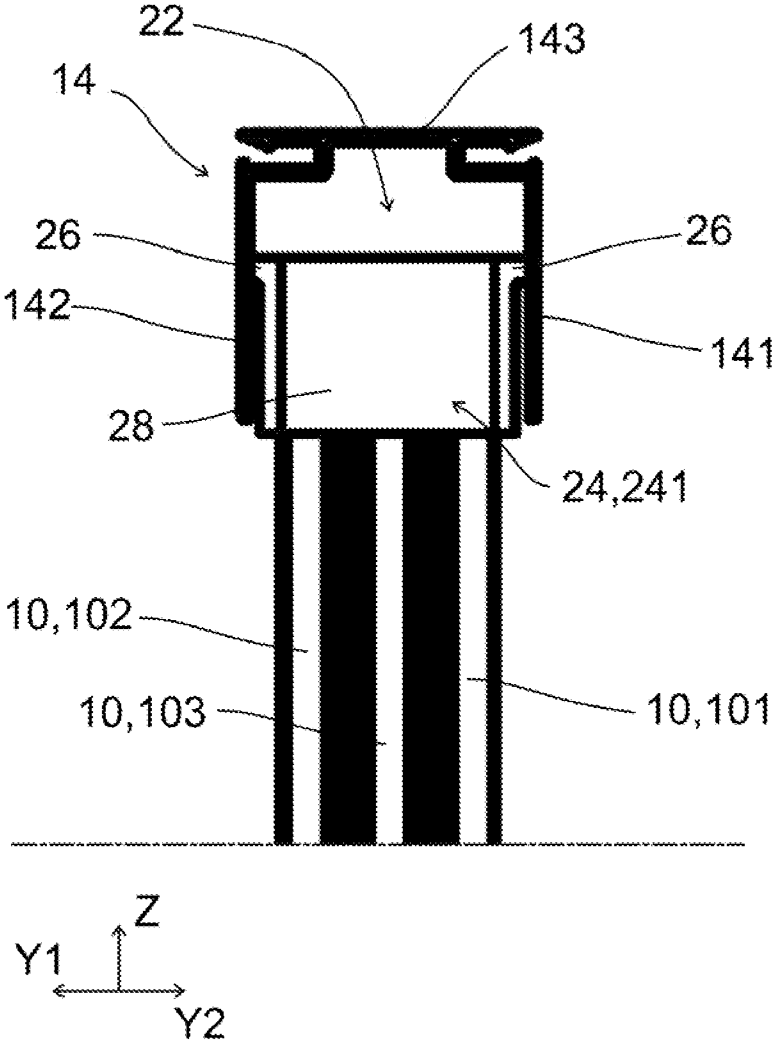
FIG. 2 shows an end view of the upper guide track of the glass panel system of FIG. 1.

FIG. 2 shows the upper guide track 14 according to an example. The upper guide track 14 consists of the two opposite side walls 141 and 142, each of which may consist of one, two, or more wall layers. Each side wall 141, 142 may have a substantially vertical outer surface and/or a substantially vertical inner surface on the side of the groove 22. At the same time, the side walls 141, 142 may constitute the outermost walls of the upper guide track 14. The side walls 141, 142 are connected by a wall structure 143 which constitutes a cover for the groove 22 and which may comprise different wall layers. The wall layers are configured, for example, for fastening the upper guide track 14. The upper guide track 14 may be, for example, a U profile.

At least one guide element 24 may be fastened to an upper part of the glass panel 10. The guide element 24 is fastened, for example, to the upper edge of the glass panel 10. According to another example, the guide element 24 is fastened to the upper part of the glass panel 10 by means of an edge strip 18. The edge strip 18 is fastened, for example, to the upper edge of the glass panel 10.

In an example, the guide element 24 comprises a body 28 provided with opposite protrusions 26 at its opposite ends, seen in the horizontal direction. Preferably, there is one protrusion 26 facing each direction, in other words, a total of two protrusions. In other words, the protrusions 26 extend in opposite directions, in the opposite lateral directions. In an example, the body 28 is fastened to the upper part of the glass panel 10 or to the edge strip 18, as presented above.

For example, the guide element 24 or the body 28 is fitted on both sides, and/or at an end, and/or on top, of the glass panel 10 or the edge strip 18, in the position of use. The protrusions 26 are arranged on both opposite sides of the glass panel 10. For example, when the guide element 24 can be placed on top of the edge strip 18, its distance from a corner or the vertical edge of the glass panel 10 is adjustable, or at least the guide element 24 can be fixed at a desired distance from it and/or from another guide element 24.

When stationary and when moving with the glass panel 10, the guide element 24 can lean against one or more side walls 141, 142 of the upper guide track 14, by means of the protrusions 26. For example, the protrusions 26 are placed against the inner surfaces of the side walls 141, 142 on the side of the groove 22.

When stationary and when moving with the glass panel 10, the guide element 24 can lean against the adjacent glass panel 10, for example its edge strip 18. For example, the protrusions 26 are placed against the side face of the glass panel 10 or the edge strip 18.

In an example, the guide element 24 continuously leans against the side wall 141, 142 or remains within a maximum distance from it, determined by clearances, when the glass panel 10 is moving. In an example, the guide element 24 continuously leans against the adjacent glass panel 10 or its edge strip 18, or remains within a maximum distance from it, determined by clearances, when the glass panel 10 is moving.

According to the example of FIG. 3, the guide elements 24 of the glass panel 10 are spaced from each other. Typically, two guide elements 24 are provided in the upper part of each glass panel 10. In an example, the guide elements 24 are placed at or close to the upper corners of the glass panel 10, or at or close to the ends of the horizontal upper edge of the glass panel 10, or at or close to the ends of the edge strip 18 at the upper edge of the glass panel 10. For example, when the guide element 24 can be placed on the edge strip 18 and can be fixed in a desired position, it is also possible to control the hitting of the guide elements 24 and their engagement to each other.

In this description, reference is also made to glass panels 101, 102 and 103 in the case of the example of FIG. 3 illustrating the operation according to the presented solution. In the different examples of the presented solution, and in this description, the term "adjacent glass panel" may alternatively refer to the glass panel 10 which does not correspond to the glass panel 103. The "adjacent glass panel" may be, for example, the glass panel 10 adjacent to the glass panel 103 but not to the glass panel 101, 102, or another glass panel 10.

According to an example of the presented solution, the glass panel system comprises at least the first glass panel 10 which may, for illustration, also be denoted by 101 in the case of the example of FIG. 3; and at least the adjacent glass panel 10 which may, for illustration, also be denoted by 103 in the case of the example of FIG. 3. In other words, at least two glass panels 10 are provided.

The upper part of the first glass panel 10, 101 is provided with the first guide element 24, which may, for illustration, also be denoted by the reference 241; and the second guide element, which may, for illustration, also be denoted by the reference 242, spaced from each other. The first guide element 24, 241 comprises two opposite protrusions 26 which lean against different side walls 141, 142 of the upper guide track 14. The second guide element 24, 242 comprises two opposite protrusions 26, one of which leans against one side wall 141 and the other leans against a glass panel 10 adjacent to the first glass panel 10, 101. The adjacent glass panel 10, 103 is provided with a guide element 24, 241 comprising two opposite protrusions 26, one of which leans against one side wall 142 and the other leans against the first glass panel 10, 101.

In another example, the glass panel system comprises at least the first glass panel 10, 101 and the adjacent glass panel 10, as well as at least the second glass panel 10, which may, for illustration, also be denoted by the reference 102, in the case of the example of FIG. 3, and a glass panel 10 adjacent to it. In other words, at least three glass panels 10 are provided, if the adjacent glass panels 10 are one and the same glass panel 10, 103 having the two guide elements 24, 241, 242 spaced from each other. Alternatively, at least four glass panels 10 are provided, including, for example, the glass panels 101, 102 and 103.

The upper part of the second glass panel 10, 102 is provided with the first guide element 24, 241 and the second guide element 24, 242, spaced from each other. The first guide element 24, 241 comprises two opposite protrusions 26, one of which leans against one side wall 142 and the other leans against the glass panel 10, 103 adjacent to the second glass panel 10, 102 and interposed between the first and the second glass panels 10, 101, 102. The adjacent glass panel 10, 103 is provided with the guide element 24, 242 comprising two opposite protrusions 26, one of which leans against one side wall 141 and the other leans against the second glass panel 10, 102. The second guide element 24, 242 of the second glass panel 10, 102 comprises two opposite protrusions 26 which lean against different side walls 141, 142 of the upper guide track 14.

In another example, the second guide element 24, 242 of the second glass panel 10, 102 is configured to hit the guide element 24, 242 of the adjacent glass panel 10, 103, and/or the first guide element 24, 241 of the second glass panel 10, 102 is configured to hit another guide element 24, 241 of the adjacent glass panel 10, 103. The hitting takes place so that by means of these guide elements 24, 241, 242, the second glass panel 10, 102, when moving, forces the adjacent glass panel 101, 103 to follow its movement after the second glass panel 10, 102 has moved beside the adjacent glass panel 10, 103 and continues its movement. The guide elements 24, 241, 242 of the adjacent glass panel 10, 103 are spaced from each other.

In other words, the glass panels 10 are moved so that they will be placed next to each other, close to each other, in different planes, for example when an opening or a passage is opened in the glass panel system. In that situation, the hitting guide element 24 simultaneously pushes the guide element 24 of the adjacent glass panel 10, and the glass panels 10 will move together, next to each other. In this way, one glass panel 10 can be pushed manually, and it will bring along another glass panel adjacent to it. The adjacent glass panel 10, in turn, can bring along a third adjacent glass panel 10.

In an example, the protrusion 26 of the second guide element 24, 242 of the first glass panel 10, 101 is further configured to engage the protrusion 26 of the guide element 24, 241 of the adjacent glass panel 10, 103, leaning against the first glass panel 10, 101. The hitting takes place so that by means of these protrusions 26, the first glass panel 10, 101, when moving, forces the adjacent glass panel 10, 103 to follow its movement after the first glass panel 10, 101 has moved past the adjacent glass panel 10, 103 and continues its movement.

In other words, the glass panels 10 are being moved so that they will be placed one after each other in different planes, for example when the glass panel system is being closed. In that situation, the hitting guide element 24 simultaneously pulls the guide element 24 of the adjacent glass panel 10, and the glass panels 10 move together, one after the other. In this way, one glass panel 10 can be pushed manually, and it will bring along another glass panel adjacent to it. The adjacent glass panel 10, in turn, may bring along a third glass panel 10 adjacent to it.

In different examples, the glass panels 101, 102 may act as the glass panels 10 which are outermost or closest to the side, the other glass panels being interposed between them, as shown in FIG. 3. Between the glass panels 101, 102, one or more glass panels 10 may be interposed, which are adjacent to each other. The glass panels 10, 101, 102 which are closest to the side or outermost, may each follow the same principles presented above, particularly in view of the leaning of the guide element 24. The glass panels 10, 103 placed in the middle, that is, interposed, each follow the same principles presented above, particularly in view of the leaning of the guide element 24.

The upper guide track 14 and/or the lower guide track 16, or the edge strip 18 and/or the edge strip 20 are, according to one example, made of aluminium or an aluminium alloy, and have a continuous or elongated profile. It is possible to use other materials and metals as well.

The guide element is preferably a piece made of a metal or plastic material, and other materials may be used as well.

According to one example, the glass panel 10 is made of tempered glass. Other glass materials may be used as well. The glass panel 10 may be a laminated structure. The glass panel 10 is preferably transparent, but glass panels with an opaque treatment may also be used.

In this description, whenever a component is referred to in singular form, the presence of the component in plural form is not excluded, unless specified otherwise. Furthermore, the term "comprise" is to be understood to be open so that it does not exclude the presence of other components as well, unless specified otherwise.

The solution presented is not limited only to the alternatives and examples shown in the accompanying figures or specifically disclosed in the foregoing description, or to which reference has been made in the description. The features disclosed in the foregoing may be combined and implemented in various combinations.

The different embodiments of the presented solution are disclosed in the accompanying claims.

The invention claimed is:

1. A glass panel system comprising a lower guide track and an upper guide track which are substantially horizontal and parallel; and at least two adjacent glass panels which are vertical and connected between the lower and upper guide tracks so that the at least two glass panels are movable along the lower and upper guide tracks in a longitudinal direction of the lower and upper guide tracks, the at least two glass panels including a first glass panel and a second glass panel, wherein each panel includes two opposite upright edges, a horizontal upper edge, and a horizontal lower edge, and each panel includes an edge strip fastened to the horizontal upper edge;

wherein the lower guide track is configured to support the at least two glass panels which are each configured to follow an own path along the lower guide track;

wherein the upper guide track comprises two opposite side walls which are parallel and extend in the longitudinal direction of the upper guide track so that an elongated groove is formed between the two side walls, the groove being downwards open and extending in the longitudinal direction of the upper guide track so that a free space is formed in the upper guide track, the free space extending from one of the two side walls to the other side wall;

wherein an upper part of the first glass panel is provided with a first guide element and a second guide element, spaced from each other, fastened to the edge strip, and arranged in the free space, wherein the first guide element comprises a body and two opposite protrusions formed at opposite ends of the body and extending laterally in opposite directions, the protrusions leaning against different ones of the two side walls, and wherein the second guide element comprises a body and two opposite protrusions, formed at opposite ends of the body and extending laterally in opposite directions, one of the protrusions leaning against one of the two side walls and an other of the protrusions leaning against the second glass panel, wherein the second glass panel is adjacent to the first glass panel and is provided with a first guide element fastened to the edge strip of the second glass panel and arranged in the free space, the first guide element including a body and two opposite protrusions formed at opposite ends of the body and extending laterally in opposite directions, one of the protrusions leaning against one of the two side walls and an other protrusion leaning against the first glass panel.

2. The glass panel system according to claim 1, wherein an upper part of the second glass panel is provided with the first guide element and a second guide element, spaced from each other, fastened to the edge strip, and arranged in the free space, wherein the second glass panel is adjacent to a third glass panel and is placed between the first and third glass panels, and wherein the second guide element comprises a body and two opposite protrusions formed at opposite ends of the body and extending laterally in opposite directions, one of the protrusions leaning against one of the two side walls and an other of the protrusions leaning against the third glass panel.

3. The glass panel system according to claim 2, wherein the second guide element of the second glass panel is configured to hit the second guide element of the first panel or the first guide element of the second glass panel is configured to hit the first guide element of the first panel in such a way that the second glass panel, when moving, forces the first glass panel to follow movement of the second glass panel after the second glass panel has moved beside the first glass panel and continues the movement.

4. The glass panel system according to claim 2, wherein one of the protrusions of the second guide element of the first glass panel is configured to engage one of the protrusions of the first guide element of the second glass panel, leaning against the first glass panel, so that by the protrusions, the first glass panel, when moving, forces the second glass panel to follow movement of the first glass panel after the first glass panel has moved past the second glass panel and continues the movement; and wherein one of the protrusions of the first guide element of the third glass panel is configured to engage one of the protrusions of the second guide element of the second glass panel, leaning against the third glass panel, so that by the protrusions, the third glass panel, when moving, forces the second glass panel to follow movement of the third glass panel after the third glass panel has moved past the second glass panel and continues the movement.

5. The glass panel system according to claim 2, wherein:

an upper part of the third glass panel is provided with a first guide element and a second guide element, spaced from each other, fastened to the edge strip, and arranged in the free space, the first guide element comprises a body and two opposite protrusions formed at opposite ends of the body and extending laterally in opposite directions, one of the protrusions leaning against one of the two side walls and an other of the protrusions leaning against the second glass panel, and the second guide element comprises a body and two protrusions formed at opposite ends of the body and extending laterally in opposite directions, the protrusions leaning against different ones of the two side walls.

6. The glass panel system according to claim 5, wherein the first guide element of the first glass panel is configured to hit the first guide element of the second glass panel or the second guide element of the first glass panel is configured to hit the second guide element of the second glass panel in such a way that the first glass panel, when moving, forces the second glass panel to follow movement of the first glass panel after the first glass panel has moved beside the second glass panel and continues the movement.

7. The glass panel system according to claim 6, wherein the first guide element of the second glass panel is configured to hit the first guide element of the third glass panel or the second guide element of the second glass panel is configured to hit the second guide element of the second glass panel in such a way that the second glass panel, when moving, forces the third glass panel to follow movement of the second glass panel after the second glass panel has moved beside the third glass panel and continues the movement.

8. The glass panel system according to claim 1, wherein one of the protrusions of the second guide element of the first glass panel is configured to engage one of the protrusions of the first guide element of the second glass panel, leaning against the first glass panel, so that by the protrusions, the first glass panel, when moving, forces the second glass panel to follow movement of the first glass panel after the first glass panel has moved past the second glass panel and continues the movement.

* * * * *